(12) United States Patent
Ishikawa et al.

(10) Patent No.: US 6,567,160 B1
(45) Date of Patent: May 20, 2003

(54) LIGHT MEASURING APPARATUS AND LIGHT MEASURING METHOD

(75) Inventors: Norio Ishikawa, Osaka (JP); Susumu Shirai, Toyohashi (JP)

(73) Assignee: Minolta Co., LTD, Osaka (JP)

( * ) Notice: Subject to any disclaimer, the term of this patent is extended or adjusted under 35 U.S.C. 154(b) by 0 days.

(21) Appl. No.: 09/447,266

(22) Filed: Nov. 23, 1999

(51) Int. Cl.[7] ................ G01J 1/10; H01J 4/14
(52) U.S. Cl. ............ 356/229; 356/213; 250/214 P
(58) Field of Search ................ 356/213, 229; 250/214 P, 214 R

(56) References Cited

U.S. PATENT DOCUMENTS

| | | | |
|---|---|---|---|
| 4,090,071 A | * 5/1978 | McCarter | ........... 250/238 |
| 4,201,472 A | 5/1980 | Maeda | |
| 4,503,508 A | * 3/1985 | Brooks et al. | ........... 396/213 |
| 4,924,081 A | 5/1990 | Arima et al. | |

\* cited by examiner

*Primary Examiner*—Zandra V Smith
(74) *Attorney, Agent, or Firm*—Burns, Doane, Swecker & Mathis, LLP

(57) ABSTRACT

A light measuring apparatus is provided with a photoelectric conversion element for converting a light energy to an electrical signal, a calculation circuit for calculating a measurement value based on the electrical signal, a memory for storing a correction value, a corrector for correcting the measurement value using the correction value, and a controller for allowing calculation of a recent correction value when the timer measures elapse of a predetermined time, and permitting the memory to renewably store the recent correction value.

26 Claims, 7 Drawing Sheets

LIGHT MEASURING APPARATUS AND LIGHT MEASURING METHOD

This application is based on patent application No. 10-338018 filed in Japan, the contents of which are hereby incorporated by references.

BACKGROUND OF THE INVENTION

This invention relates to a light measuring apparatus for measuring a light amount of visible radiation, infrared radiation or ultraviolet radiation such as a light meter, an infrared intensity meter, an ultraviolet intensity meter, a light power meter, a color meter or a luminance meter, and a light measuring method, particularly to zero-point calibration (offset correction) of a light measuring apparatus.

A light measuring apparatus is mainly comprised of a photodetector for converting a received light into a current and then outputting it, and a circuit for converting the current outputted from the photodetector into a voltage and calculating a light reception amount based on the voltage value or for integrating the current outputted from the photodetector for a predetermined period and calculating the light reception n amount based on this integral value. As a method for the zero calibration (zero-point correction) of the light measuring apparatus are known a method which is carried out by shading the photodetector as, for example, disclosed in U.S. Pat. No. 4,201,472 and a method which is carried out by electrically disconnecting the photodetector and the calculating circuit as, for example, disclosed in U.S. Pat. No. 4,924,081.

According to the calibration method carried out by shading the photodetector, a state where no light is incident on the photodetector is set as a zero reference of the measuring apparatus. Thus, this method should be treated as a standard in guaranteeing a measurement precision. However, this method has a disadvantage of cumbersome calibration since calibration has to be manually performed because of a necessity to shade the light receiving portion of the apparatus by a special cap or the like. In order to improve operability of this calibration method (hereinafter, "standard zero-point calibration method"), it may be considered to provide the apparatus main body with a barrier or shutter for shading the photodetector. However, such a construction has not been put into practice due to limits in an arrangement space, complication of construction, the size of the apparatus and a production cost.

On the other hand, according to the method carried out by electrically disconnecting the photodetector and the calculating circuit from each other, a switch S1 is provided between a photodetector SP1 and an amplifying circuit AMP (constructing a part of the calculating circuit) for amplifying a light current outputted from the photodetector SP1, a switch S2 is provided in parallel with the photodetector SP1 as shown in FIG. 8. A state where no light is incident on the photodetector SP1 is realized by a circuit by turning the switch S1 off while turning the switch S2 on (by disconnecting the photodetector SP1 from the amplifying circuit AMP). Thus, an offset amount for the zero-point calibration is calculated without shading the photodetector SP1.

This calibration method enables automation of the zero-point calibration and reduces cumbersomeness of the manual operation in the standard zero-point calibration method. However, since the zero reference is located not on a light receiving surface of the photodetector SP1, but at an input end of the amplifying circuit AMP, this is, strictly speaking, different from the standard zero-point calibration method. This method is put into practice as a method for compensating the standard zero-point calibration method since a difference between the offset amount calculated according to this method (hereinafter, simple zero-point calibration method) and the one calculated according to the standard zero-point calibration method is so small as to cause no problem in practical level.

Normally, when the light measuring apparatus is started, zero-point calibration is first performed. Thereafter, light measurement, i.e., measurement of illuminance, light intensity, or luminance is performed without performing zero-point calibration unless particularly required.

However, the offset amount used for the zero-point calibration may change during measurement. For example, in the case that temperature in the working environment of the apparatus changes, the offset amount of the calculating circuit for the zero-point calibration may change by being influenced by the temperature change. Further, in the construction for realizing the simple zero-point calibration by electrically disconnecting the photodetector SP1 and the amplifying circuit AMP by means of an electronic switch such as a transistor, it is impossible to completely electrically disconnect them, and a part of the light current outputted from the photodetector SP1 leaks into the amplifying circuit AMP. Accordingly, the offset amount for the zero-point calibration changes also in the case that the leak current changes due to a change of the electronic switch with time. Furthermore, the above offset amount may change due to a change in the leak current from a logic signal for controlling the electronic switch. In a measuring apparatus having a plurality of measurement ranges to ensure a sufficiently large total measurement range. The above offset amount may vary by switching the measurement ranges.

If the offset amount for the zero-point calibration changes during the measurement, it is not preferable since the reliability of measurement values is considerably reduced even if measurements of high precision are possible. In the light measuring apparatus for performing a zero-point calibration only according to the standard the zero-point calibration method, an operator has to manually shade the photodetector for the zero-point calibration in a zero-point calibration mode. Thus, the reliability of the measuring apparatus depends on handling of the operator. Therefore, it is difficult to securely guarantee the reliability of the apparatus.

On the other hand, U.S. Pat. No. 4,924,081 discloses only the simple zero-point calibration method, but contains no disclosure on a method for solving the above problem using the simple zero-point calibration method. Neither does this patent disclose any method for securely performing the zero-point calibration by combining the standard and simple zero-point calibration methods to stabilize the measurement precision of the light measuring apparatus.

SUMMARY OF THE INVENTION

It is an object of the invention to provide a light measuring apparatus and a light measuring method which have overcome the problems residing in the prior art. According to an aspect of the invention, a light measuring apparatus comprises a photoelectric conversion element for converting a light energy to an electrical signal, a calculator for calculating a measurement value based on an electrical signal, a memory for storing a correction value, a corrector for correcting the measurement value using the correction value stored in the memory.

There is further provided a timer for measuring an elapse of time after the correction value is stored in the memory, and a controller for allowing calculation of a recent correction value when the timer measures elapse of a predetermined time, and permitting the memory to renewably store the recent correction value.

Alternatively, there may be provided a controller responsive to a measurement range change for allowing calculation of a recent correction value each time the measurement range is changed, and permitting the memory to renewably store the recent correction value.

According to another aspect of the invention, a method for measuring light using a light measurement apparatus provided with a photoelectric conversion element for receiving and converting a light energy into an electrical signal, and a calculation circuit for calculating a measurement value based on the signal. The method comprises the steps of storing a first correction value for correcting a measurement value, judging whether a predetermined time elapses after the first correction value is stored, calculating a second correction value when the predetermined time is judged to elapse, renewably storing the second correction value, and correcting the measurement value with the second correction value.

Alternatively, the method comprises the steps of storing a first correction value for correcting a measurement value, detecting whether the measurement range is changed, calculating a second correction value when the measurement range is changed, renewably storing the second correction value, and correcting the measurement value with the second correction value.

These and other objects, features, aspects and advantages of the present invention will become more apparent from the following detailed description of the present invention when taken in conjunction with the accompanying drawings.

DETAILED DESCRIPTION OF THE PREFERRED EMBODIMENT OF THE INVENTION

An illuminance meter embodying the invention will be described with reference to the drawings. However, it should be noted that the present invention is not limited to illuminance meters, but may be applicable to various other light measuring apparatuses including infrared intensity meters, ultraviolet intensity meters, light power meters, color meters, flash meters and exposure meters.

Figure 1:
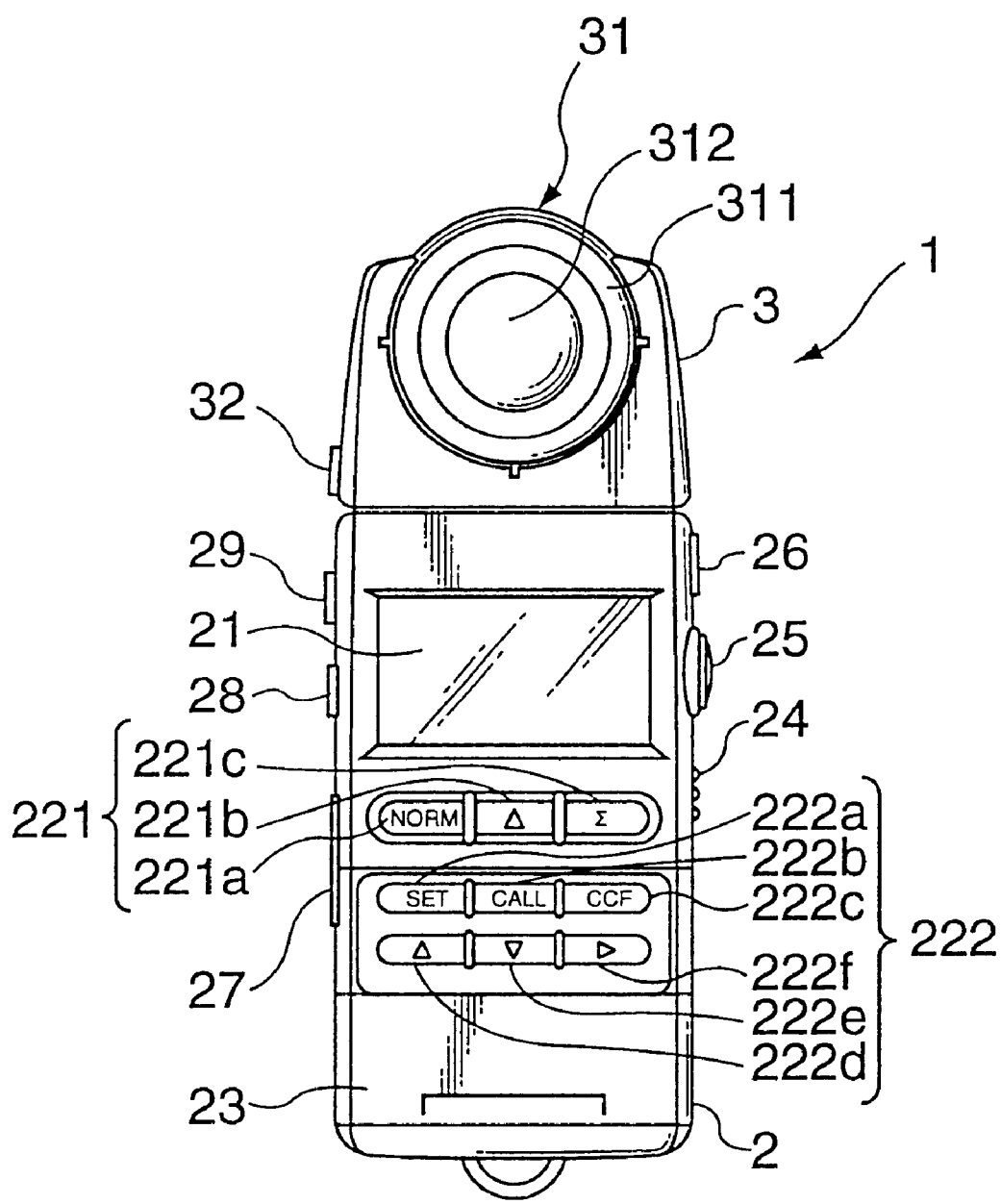
FIG. 1 is a front view of an illuminance meter according to an embodiment of the invention.
Figure 2:
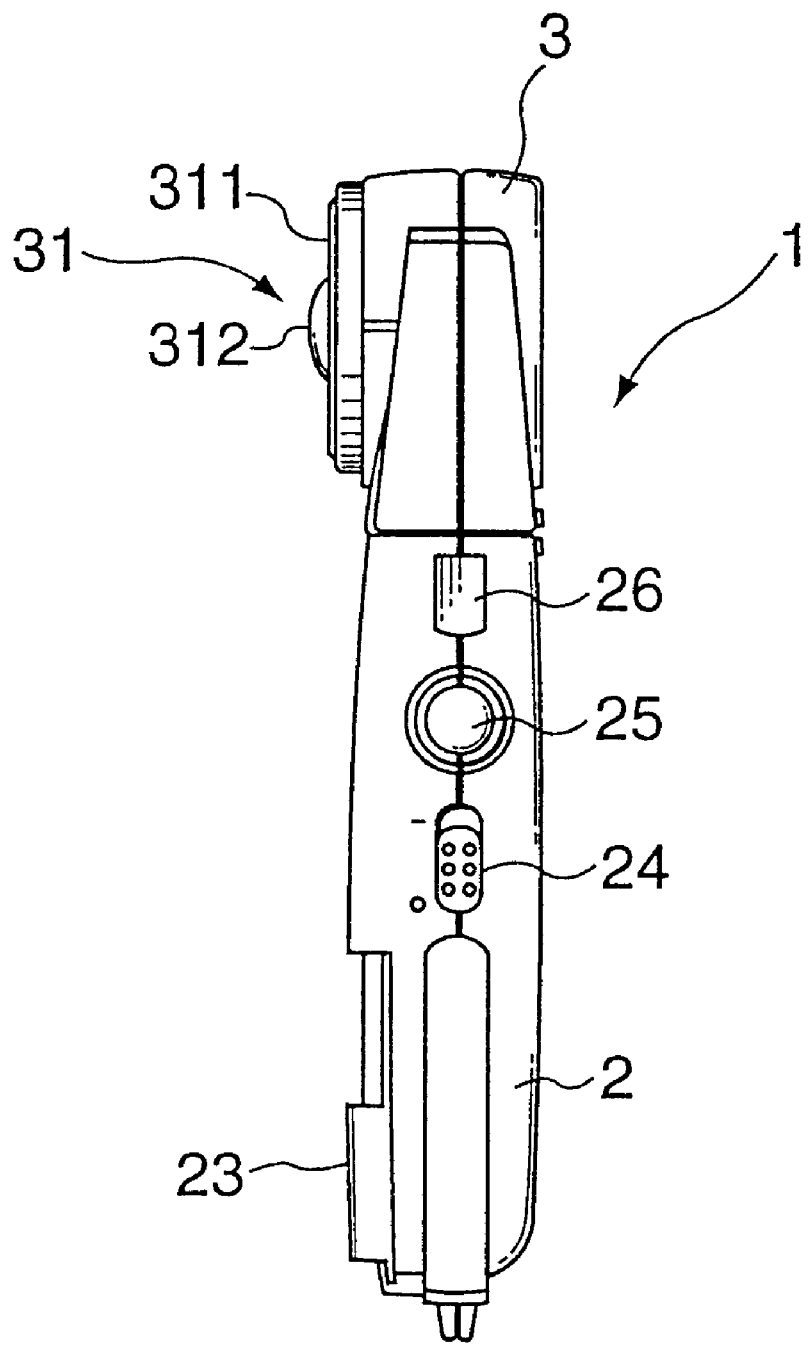
FIG. 2 is a right side view of the illuminance meter.
Figure 3:
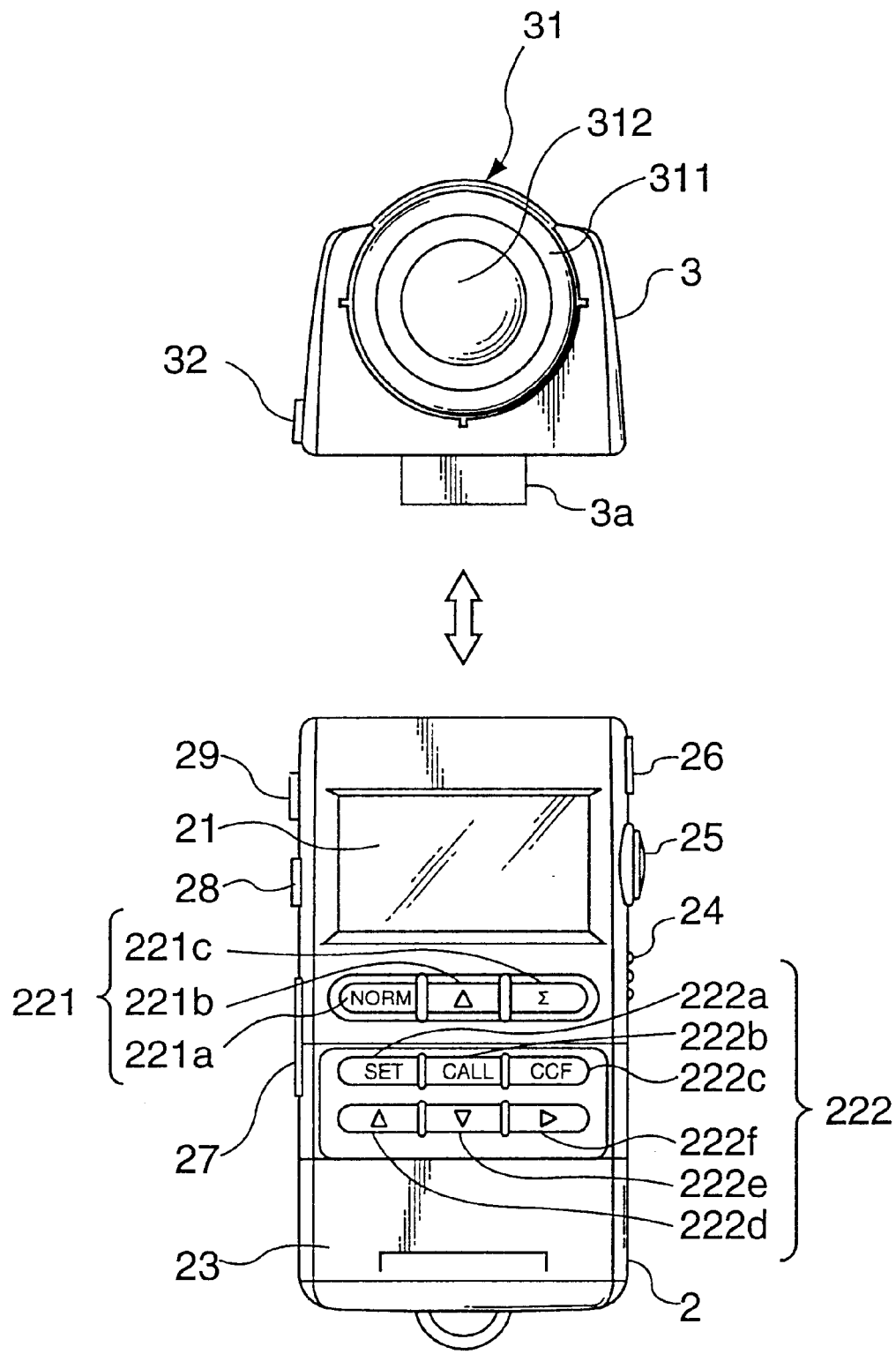
FIG. 3 is a front view showing a light receiving section and a main body of the illuminance meter in their separated state.

As shown in FIGS. 1 to 3, an illuminance meter 1 is comprised of a main body 2 and a light receiving section 3 detachably mountable on the top surface of the main body 2. A connecting portion 3a projects substantially in the middle of the bottom surface of the light receiving section 3, and a mating connecting portion 2a (see FIG. 4) is formed substantially in the middle of the top surface of the main body 2. The light receiving section 3 is mounted on the main body 2 by fitting the connecting portion 3a into the connecting portion 2a of the main body 2. The connecting portions 2a, 3a are each provided with a plurality of connection terminals. When the light receiving section 3 is mounted on the main body 2, they are electrically connected with each other via the connection portions 2a, 3a.

A display panel 21 for digitally displaying measurement results and specified pieces of character information is provided in an upper part of the front surface of the main body 2. Although the display panel 21 is made of a passive type display device such as a liquid crystal display (LCD), an electrochemical display (ECD), or electrophoretic display (EPID) in this embodiment, it may be made of a light-emitting diode (LED) or a plasma display.

First and second operating sections 221, 222 are provided in this order below the display panel 21. The illuminance meter 1 according to this embodiment has three measurement modes: "normal mode", "relative illuminance mode" and "integral illuminance mode". The first operating section 221 includes operation keys 221a, 221b, 221c for switchingly setting the measurement modes.

The normal mode is a mode for measuring a normal illuminance value L[1x] and is set by the operation key 221a (hereinafter, "normal key"). The normal mode is set as an initial measurement mode, and the illuminance value L is repeatedly measured in a specified cycle of, e.g., 1 second after a zero calibration is performed by a simple zero-point calibration method at the beginning of the measurement. Measurement results are displayed on the display panel 21.

In the relative illuminance mode, a relative illuminance value $\Delta L$ (=L−Lr) [1x] of the measurement illuminance value L [1x] from a predetermined reference illuminance value Lr or its percentage $\Delta L\%$ (=(L−Lr)·100/Lr [%] is calculated, and the calculation result is displayed on the display panel 21. This mode is set by the operation key 221b (hereinafter, "Δ-key"). When the Δ-key 221b is operated, the relative illuminance value $\Delta Ln$ [1x] is displayed on the display panel 21. When the Δ-key 221b is further operated, the relative illuminance value $\Delta Ln$ [1x] is displayed in percentage $\Delta Ln\%[\%]$ on the display panel 21. Hereinafter, every time the Δ-key 221b is operated, $\Delta Ln$ and $\Delta Ln\%$ are alternately displayed on the display panel 21.

In the integral illuminance mode, an integral illuminance value Lsum (=L (illuminance) x t(measurement time)) [1x·h] and an average illuminance value Lave (=L (illuminance)/N (number of measurements) [1x] are calculated based on the respective illuminance values from the start of the measurement, and the calculation result is displayed on the display panel 21. This mode is set by the operation key 221c (hereinafter, "Σ-key"). When the Σ-key 221c is operated, the integral illuminance value Lsum [1x·h] is displayed on the display panel 21. When the Δ-key 221c is further operated, the integral time $\Delta T$[h] is displayed on the display panel 21. When the Δ-key 221c is further operated, the average illuminance value Lave [1x] is displayed on the display panel 21. Hereinafter, every time the Δ-key 221c is operated, Lsum, $\Delta T$ are cyclically displayed on the display panel 21.

The second operating section 222 is an operable member used to store data in a memory and read it from the memory, and includes operation keys 222a to 222f. Normally the operation keys 222a to 222f are covered by a vertically slidable lid 23 to avoid an erroneous operation since they are seldom used during the illuminance measurement.

The operation key 222a (hereinafter, "SET key") used to set data such as the reference illuminance Lr in the relative illuminance mode and an integral limit value in the integral illuminance mode. The operation key 222b (hereinafter, "CALL key") used to read the data including the reference illuminance Lr stored in the memory. The operation key 222c is used when a displayed measurement value is wished to approximate to a specific value.

The operation keys 222d, 222e are operations keys used to search data when the data are inputted in the memory. The operation key 222d (hereinafter, "UP-key") is used to search the data in an upward direction, whereas the operation key 222e (hereinafter, "DOWN-key") is used to search the data in a downward direction. The operation key 222f (hereinafter, "SHIFT key") is used to advance ciphers of a numeral value when the data is inputted in the memory.

On the right side of the main body 2 are provided a main switch 24 substantially in the middle, a hold button 25 and a detaching button 26 in specified positions in this order above the main switch 24. The main switch 24 is adapted to activate the illuminance meter 1. The main switch 24 is made of a slide switch 24 and is turned on when being set to an upper position while being turned off when being set to a lower position. The hold button 25 is adapted to hold the illuminance measurement value L displayed on the display panel 21. Every time the hold button 25 is operated, a hold state and a non-hold state are alternately designated. The detaching button 26 cancels a locked state of the main body 2 and the light receiving section 3 to enable the detachment of the light receiving section 3 from the main body 2. When the detaching button 26 is pressed, a mechanism (not shown) for locking coupled portions of the main body 2 and the light receiving section 3 is disengaged, thereby detaching the main body 2 and the light receiving section 3 from each other.

Substantially in the middle of the left side surface of the main body 2 is provided a digital interface terminal 27 through which the measurement data (digital data) is outputted. Above the digital interface terminal 27 are provided a DC power terminal 28 and a response speed changeover switch 29 in this order. The digital interface terminal 27 is adapted to connect the illuminance meter 1 with a data processor such as a personal computer, so that a desired data processing can be performed in the personal computer. In the case of a multiple point measurement, it is particularly convenient since measurement data at all measurement points can be processed in a batch using the personal computer. The DC power terminal 28 is adapted to supply a DC power from an AC adapter. The response speed changeover switch 29 is used to switch a response speed in the illuminance measurement and is made of a slide switch. A normal response speed (speed during the normal measurement) is set when the switch 29 is set to an upper position, whereas the response speed is slower than the normal response speed when the switch 29 is set to a lower position. The switch 29 enables a stable and precise measurement by slowing the response speed in the case that, like a ripple light, the illuminance varies substantially in the same manner as an alternate current does.

The light receiving section 3 includes a round light receiving window 31 on its front surface, and a frame 311 slanted toward the inside is provided around the window 31. Behind the window 31 are arrayed light receiving elements such as SPDs (silicon photo diodes), which are covered by a semispherical diffusion plate 312. On the left side surface of the light receiving section 3 is provided an analog output terminal 32 through which an analog signal corresponding to an amount of light received by the light receiving elements is outputted.

Figure 4:
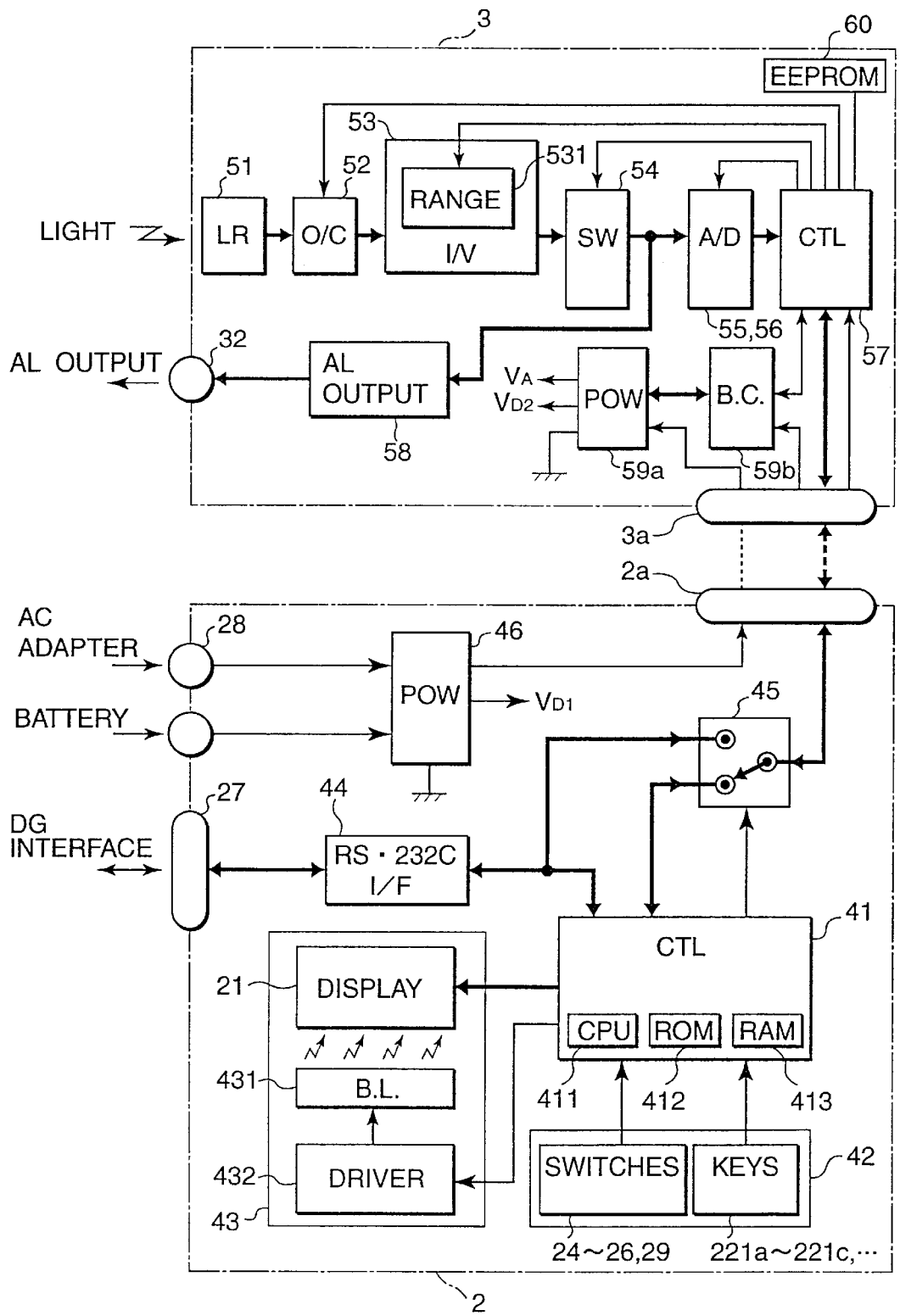
FIG. 4 is a block diagram showing a construction of the illuminance meter.

FIG. 4 is a block construction diagram of the illuminance meter 1. The electrical construction of the main body 2 is described with reference to FIG. 4.

The main body 2 is provided with a main body controller 41 including a central processing unit (CPU) 411, a ROM 412 and a RAM 413. The ROM 412 is a memory for storing a processing program for the illuminance measurement and necessary initial data, and the RAM 413 is a memory used when the CPU 411 executes calculation during the illuminance measurement in accordance with the processing program. The thus constructed main body controller 41 is directly electrically connected with an operation unit 42, a display unit 43 and a communication interface 44, and is also electrically connected with a controller of the light receiving section 3 via a changeover switch 45 and the connecting portions 2a, 3a. The controller 41 conducts the illuminance measurement in accordance with an external command given via the operation unit 42 and causes the measurement result to be displayed on the display panel 21 of the display unit 43.

Specifically, the operation unit 42 is so constructed as to input data necessary for the illuminance measurement and is comprised of switches and buttons including the aforementioned main switch 24, response speed changeover switch 29, hold button 25 and operation keys including the normal key 221a to the Δ-key 221c, and the SET key 222a to the SHIFT key 222f.

The display unit 43 includes the display panel 21, and displays a variety of pieces of information on the display panel 21 by feeding the image signals from the main body controller 41 to the display panel 21 via a display driver (not shown). Since the display panel 21 is constructed by a passive type display device in this embodiment, a backlight 431 is arranged on the rear surface of the display panel 21 in order to make the display content easier to see by illuminating the display panel 21 if necessary. The backlight 431 is controllably turned on and off by feeding a drive command from the main body controller 41 to a backlight driving circuit 432.

The communication interface 44 is electrically connected with the digital interface terminal 27. By connecting the digital interface terminal 27 with a personal computer, measurement data can be bilaterally communicated between the personal computer and the main body controller 41 via the communication interface 27. This enables the application of the illuminance meter 1 in a wider range. Further, if the changeover switch 45 is connected with the communication interface 44 (an upper node in FIG. 4) in accordance with a switch command from the main body controller 41, measurement data can be bilaterally and directly communicated between the personal computer and a receiving section controller 57 via the communication interface 44.

Identified by 46 in FIG. 4 is a power supply circuit in the main body 2. The power supply circuit 46 supplies a power to the respective elements of the main body 2.

Figure 5:
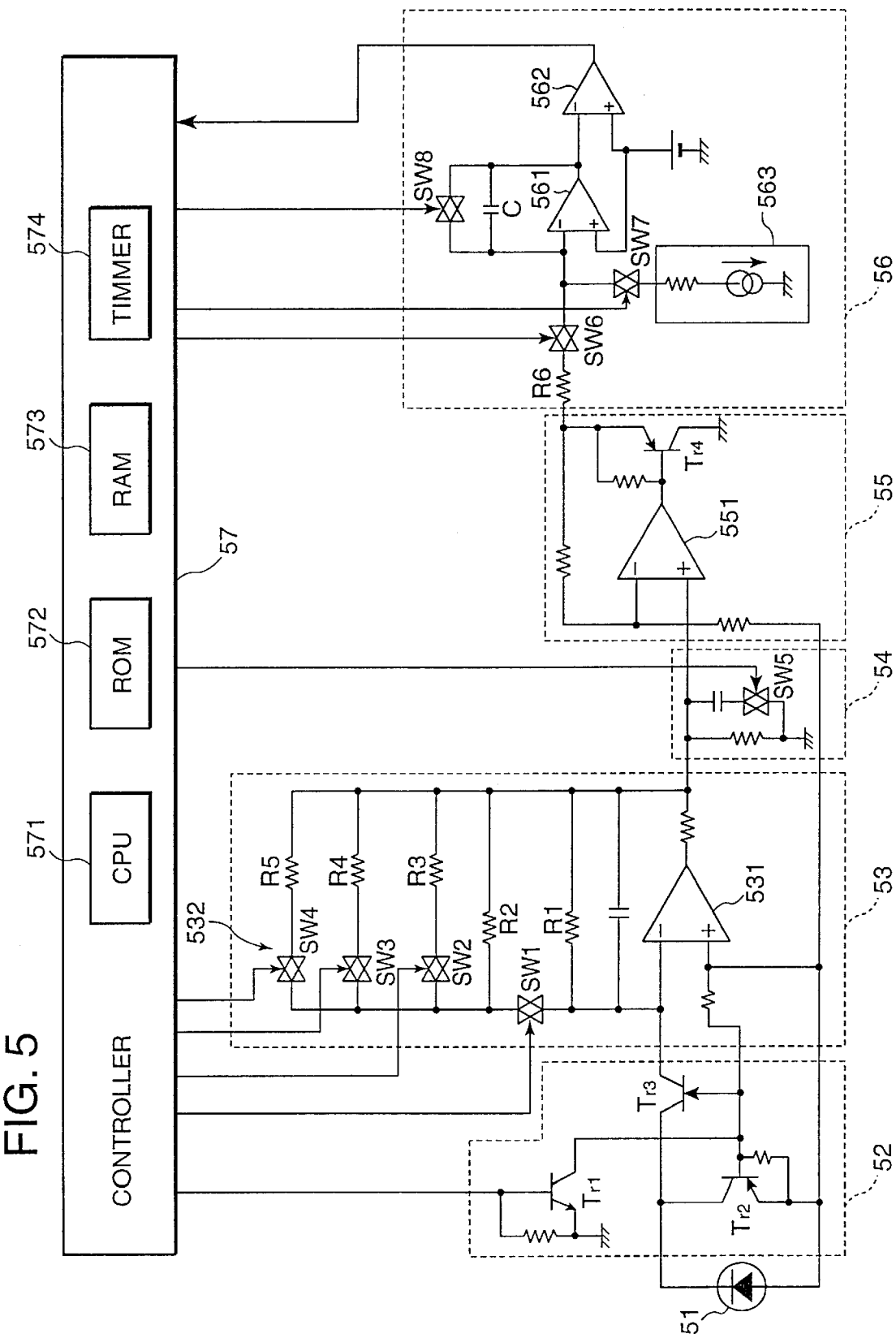
FIG. 5 is a diagram showing a part of an electrical construction of the light receiving section.

FIG. 5 is a diagram showing a part of the electrical construction of the light receiving section 3. The electrical construction of the light receiving section 3 is described in detail with reference to FIGS. 4 and 5.

In the light receiving section 3, a light receiving element 51 functioning as a photoelectric conversion means is provided behind the light receiving window 31 (see FIG. 1, etc.) to convert the received light energy into an electrical energy and then output it to an I/V converting circuit 53 via an opening/closing circuit 52.

The opening/closing circuit 52 is an electronic switch for controlling an electrical connection between the light receiving element 51 and the I/V converting circuit 53 when the zero calibration is performed. More specifically, the opening/closing circuit 52 is comprised of three transistors Tr1 to Tr3 as shown in FIG. 5. The pnp transistor Tr2 is connected in parallel with the light receiving element 51. The field-effect transistor Tr3 is provided between a cathode of the light receiving element 51 and an inverted input terminal of an operational amplifier 531 of the I/V converting circuit 53. A gate of the field-effect transistor Tr3 and a base of the pnp transistor Tr2 are connected with a normal input terminal of the operational amplifier 531 via a resistor. Further, a collector of the npn transistor Tr1 is connected with the base of the transistor Tr2 and an emitter thereof is grounded.

Accordingly, upon the input of a high-level control signal from the receiving section controller 57 to the base of the transistor Tr1, the transistor Tr1 is turned on and the base of the transistor Tr2 and the gate of the field effect transistor Tr3 become low level, thereby turning the transistor Tr2 on while turning the transistor Tr3 off. As a result, the light receiving element 51 is electrically disconnected from the I/V converting circuit 53 and forms a closed circuit with the transistor Tr2. This enables the zero calibration by the simple zero-point calibration method. On the other hand, upon the input of a low-level control signal from the receiving section controller 57 to the base of the transistor Tr1, the transistor Tr1 is turned off and the base of the transistor Tr2 and the gate of the field effect transistor Tr3 become high level, thereby turning the transistor Tr2 off while turning the transistor Tr3 on. As a result, the transistor Tr2 is electrically disconnected from the light receiving element 51, which is electrically connected with the I/V converting circuit 53, enabling the illuminance measurement.

Although the opening/closing circuit 52 for electrically connecting and disconnecting the light receiving element (photoelectric converting element) 51 and the I/V converting circuit (light reception amount calculator) 53 is constructed by the three transistors Tr1 to Tr3 in this embodiment, this construction is not limited thereto. Any construction may be adopted provided that it can control the electrical connection and disconnection of the light receiving element 51 and the I/V converting circuit 53.

The I/V converting circuit 53 includes an inverted amplifying circuit using an operational amplifier 531, and is adapted to convert the light current from the light receiving element 51 into a voltage, amplify the converted voltage, and output an analog signal corresponding to the light reception amount. Five resistors R1 to R5 are connected in parallel between an inverted input terminal and an output terminal of the operational amplifier 531. The resistors R2 to R5 are connected in parallel via analog switches SW1 to SW4, and an amplification ratio of the I/V converting circuit 53 can be changed in 5 stages by controlling the analog switches SW1 to SW4. In other words, the illuminance meter 1 has five measurement ranges and enables the illuminance measurement in a wider range by switching the measurement range according to the light reception amount. In this embodiment, a range switching circuit (range setter) 532 is constructed by four analog switches SW1 to SW4, and the measurement range is set by setting the on-off states of the switches SW1 to SW4 in accordance with a control command from the receiving section controller 57.

The analog signal obtained in the measurement range set in the I/V converting circuit 53 (hereinafter, "set measurement range") is fed to a buffer circuit 55 via a response speed switching circuit 54 and to the analog output terminal 32 via an analog output circuit 58 (see FIG. 4). The response speed switching circuit 54 on-off controls an analog switch SW5 in accordance with a speed switch command outputted from the receiving section controller 57 according to the state of the response speed changeover switch 29, thereby switching the response speed between the normal response speed (speed during normal measurement) and the response speed slower than the normal response speed.

The buffer circuit 55 is a level converting circuit comprised of an operational amplifier 551 and a pnp transistor Tr4, and matches the I/V converting circuit 53 and the. A/D converting circuit 56 with each other.

The A/D converting circuit 56 converts the electrical signal (analog signal) outputted from the I/V converting circuit 53 via the response speed switching circuit 54 and the buffer circuit 55 into a digital electrical signal. The A/D converting circuit 56 is constructed by a double integrating circuit using two operational amplifiers 561, 562. In feedback circuits between an inverted input terminal of the operational amplifier 561 and a discharging circuit 563 connected with the inverted input terminal of the operational amplifier 561 and between an output terminal of the operational amplifier 561 and the inverted input terminal thereof are provided analog switches SW6 to SW8. The A/D conversion (i.e., illuminance measurement) is controlled by on-off controlling the analog switches SW6 to SW8.

The control of the analog switches SW6 to SW8 is performed by the receiving section controller 57. When the switches SW7, SW8 are turned off while the switch SW6 is turned on after the integrating circuit including the operational amplifier 561 is reset by turning the switch SW8 on, a voltage inputted via the resistor R6 is integrated. If the switch SW6 is turned off and the switch SW7 is turned on after the elapse of a predetermined time following the start of the integration, electric charges stored in the capacitor C are discharged via the discharging circuit 563, and the operational amplifier 562 outputs a detection signal representing a discharge start timing and a discharge end timing. This detection signal is inputted to the receiving section controller 57, and a discharge time T is measured using a timer 574 of the receiving section controller 57 based on the detection signal. Since the discharge time T is proportional to the amount of light received by the light receiving element 51, illuminance is calculated by converting the discharge time T into a light reception amount per unit time in the receiving section controller 57.

The receiving section controller 57 for controlling the I/V converting circuit 53, the response speed switching circuit 54 and the A/D converting circuit 56 as described above is provided with a CPU 571, a ROM 572, a RAM 573 and a timer 574 as shown in FIG. 5 and controls the entire light receiving section 3.

Identified by 59a in FIG. 4 is a power supply circuit of the light receiving section 3 for supplying power to the respective elements of the light receiving section 3. This power supply circuit 59a is electrically connected with the receiving section controller 57 via a battery checking circuit 59b. Identified by 60 is an EEPROM for storing a zero-point difference obtained by performing the standard zero-point calibration as described later.

Next, the zero calibration of the illuminance meter 1 is described with reference to a timing chart of FIG. 6.

Figure 6:
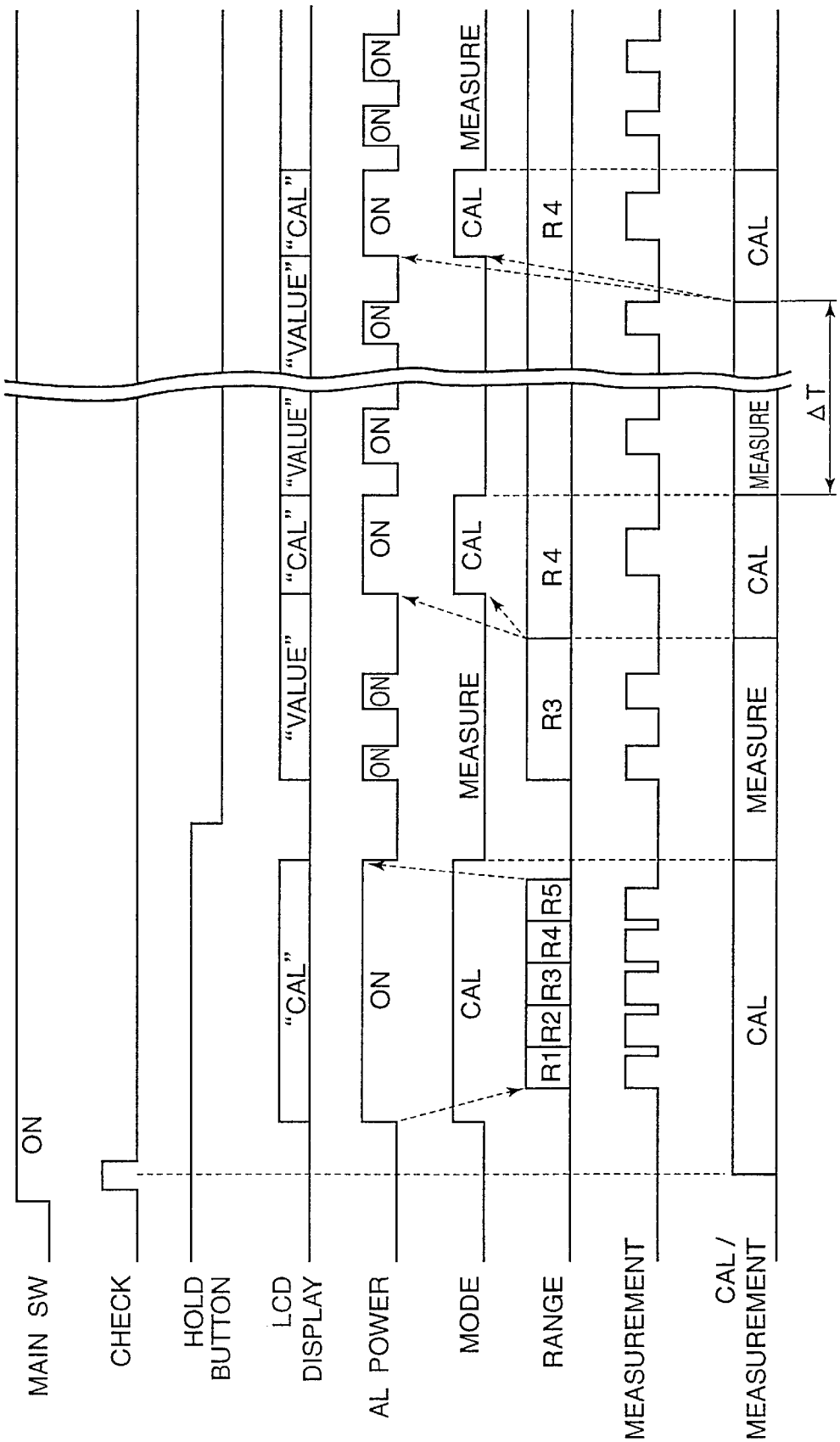
FIG. 6 is a timing chart showing an operational relationship of the illuminance meter for a performance of automatic zero-point calibration according to a simple zero-point calibration method.

When the illuminance meter 1 is activated by turning the main switch 24 on, the calibration mode is entered to perform the zero calibration after the states of the operation buttons and/or operation keys are checked (see Mode Setting in FIG. 6). In the zero calibration, the illuminance measurement is performed for each measurement range by successively changing the five measurement ranges with an analog power source of the light receiving section 3 turned on and the light receiving element 51 disconnected from the I/V converting circuit 53 (see CAL/Measurement Range and CAL Measurement of FIG. 6).

Specifically, the light receiving element 51 is disconnected from the I/V converting circuit 53 by turning the transistor Tr1 on. In this state, most of the output current of the light receiving element 51 flows into the transistor Tr2 regardless of whether the light receiving element 51 is shaded or not, and the light current inputted to the I/V converting circuit 53 is negligibly small.

Next, after a feedback resistance value of the operational amplifier 531 is so set as to equal a parallel resistance value of the resistors R1 to R5 by turning all the switches SW1 to SW4 on (i.e., after the measurement range 1 is selectively set), the illuminance measurement is performed by driving the A/D converting circuit 56. An illuminance value Loff1 obtained in this measurement is an offset amount for the zero-point calibration since there is no input to the I/V converting circuit 53. This offset amount Loff1 is stored in the RAM 573 in correspondence with the measurement range 1.

When the measurement of the offset amount Loff1 for the measurement range 1 is completed, the feedback resistance value of the operational amplifier 561 is so set as to equal a parallel resistance value of the feedback resistors R1 to R4 by turning only the switch SW4 off (i.e., the set measurement range is switched to the measurement range 2). In this state, the illuminance measurement is performed by driving the A/D converting circuit 56 to calculate an illuminance value Loff2 for the measurement range 2. This illuminance value Loff2 is stored in the RAM 573 in correspondence with the measurement range 2. Hereinafter, the set measurement range is successively switched to the measurement range 3, to the measurement range 4 and to the measurement range 5, and the illuminance measurement is performed by driving the A/D converting circuit 56 for each measurement range to calculate offset amounts Loff3 to Loff5 corresponding to the measurement ranges 3 to 5. The offset amounts Loff3 to Loff5 are stored in the RAM 573 in correspondence with the measurement ranges 3 to 5, respectively. It should be noted that a character information "CAL" is displayed on the display panel 21 during the measurements of the offset amounts Loff1 to Loff5. This character display is designed to notify a user that the zero calibration is being performed.

Upon the completion of the zero calibration for all measurement ranges, the analog power supply is turned off and the calibration mode is automatically switched to a measurement mode. Then, the analog power supply is turned on again for the normal illuminance measurement (see Analog Power Supply and Mode in FIG. 6).

When the measurement mode is set, the light receiving element 51 is connected with the I/V converting circuit 53 by turning the transistor Tr1 off, and the illuminance measurement is performed in the set measurement range. In the example of FIG. 6, the illuminance measurement is performed in the measurement range 3 (see CAL/Measurement Range of FIG. 6). Specifically, the illuminance measurement is repeated by driving the A/D converting circuit 56 in a specified cycle with the switches SW1, SW2 turned on and the switches SW3, SW4 turned off. It should be noted that the respective illuminance measurement values L are calculated by subtracting the offset amount Loff3 corresponding to the measurement range 3 from an actual measurement value Lm. Subsequently, the display of "CAL" on the display panel 21 is cleared, and the respective illuminance measurement values L (=Lm−Loff3) are successively displayed on the display panel 21 (see LCD Display in FIG. 6). Here, since a difference between the offset amount calculated by the simple zero-point calibration method and the one calculated by the standard zero-point calibration method, i.e., a zero-point difference is very small as described in the description of the "Prior Art", the illuminance measurement value L is calculated by ignoring the zero-point difference. Measurement precision can be further improved by calculating the illuminance measurement value while taking the zero-point difference into consideration. In other words, assuming that "$\delta L03$" denotes a zero-point difference between the offset amount for the measurement range 3 calculated by the simple zero-point calibration method and the one calculated by the standard zero-point calibration method, the illuminance measurement value L can be calculated by following equation:

$$L = Lm - Loff3 + \delta L03.$$

This also applies for the other measurement ranges. A procedure of obtaining zero-point differences $\delta L01$ to $\delta L05$ is described in detail later with reference to FIG. 7.

If the measurement range is switched before the illuminance measurement in the set measurement range is continued for a predetermined time $\Delta T$ (e.g., about 10 minutes), the zero calibration for the newly set measurement range is performed before the illuminance measurement in this measurement range is started. For example, if the measurement range 3 is switched to the measurement range 4 before the illuminance measurement in the set measurement range is continued for the predetermined time $\Delta T$, the zero calibration for the measurement range 4 is performed. Specifically, the light receiving element 51 is disconnected from the I/V converting circuit 53 by turning the transistor Tr1 on, and the illuminance measurement is performed by driving the A/D converting circuit 56 with the switch SW1 turned on and the switches SW2 to SW4 turned off. Then, the offset amount Loff4 stored in the RAM 573 is replaced by this newly obtained measurement value Loff4.

Upon the completion of the zero calibration for the measurement range 4, the analog power supply is turned off and the calibration mode is automatically switched to the measurement mode. Then, the normal illuminance measurement is performed in the measurement range 4 (see Analog Power Supply and Mode in FIG. 6).

On the other hand, if the illuminance measurement in the set measurement range is continued for the predetermined time $\Delta T$ without switching the measurement range, the illuminance measurement is interrupted and the zero calibration is performed again for the set measurement range. For example, if the illuminance measurement is continued in the measurement range 4 for the predetermined time $\Delta T$ in the example of FIG. 6, the measurement mode is automatically switched to the calibration mode, and the zero calibration is performed for the measurement range 4 (see Mode and CAL/Measurement Range of FIG. 6). In other words, after the light receiving element 51 is disconnected from the I/V converting circuit 53 by turning the transistor Tr1 on, the illuminance measurement is performed by driving the A/D converting circuit 56. Then, the offset amount Loff4 stored in the RAM 573 is replaced by this measurement value Loff4.

Upon the completion of the zero calibration for the measurement range 4, the analog power supply is turned off and the calibration mode is automatically switched to the measurement mode. Then, the normal illuminance measurement is performed in the measurement range 4

Thereafter, until the main switch 24 is turned off, the zero calibration (with-the-time renewing process) by the simple zero-point calibration method is performed for the illuminance measurement every time the measurement range is switched or every time the measurement in the same measurement range is continued for the predetermined time $\Delta T$.

Since the zero calibration is automatically performed by the simple zero-point calibration method when the illuminance meter 1 is activated as described above, it is not necessary to perform the zero-point calibration by manually mounting a cap on the light receiving element 51, making the handling of the illuminance meter 1 easier. Further, since the zero calibration is automatically performed for the newly set measurement range before the illuminance measurement in this measurement range is started every time the measurement range is switched (with-the-time renewing process), the illuminance measurement can be precisely performed even if the zero point of the illuminance meter 1 changes due to a change in working environment temperature and a change in characteristics of the measuring circuit resulting from a change with the passage of time.

The simple zero-point calibration method solves the cumbersomeness of the zero calibration by the standard zero-point calibration method to improve the operability of the illuminance meter 1. However, the simple zero-point calibration method cannot completely replace the standard zero-point calibration method, and the reference zero calibration needs to be performed by the standard zero-point calibration method. Accordingly, the illuminance meter 1 of this embodiment can also perform the zero calibration by the standard zero-point calibration method.

Next, the zero calibration by the standard zero-point calibration method is described with reference to FIG. 7.

Figure 7:
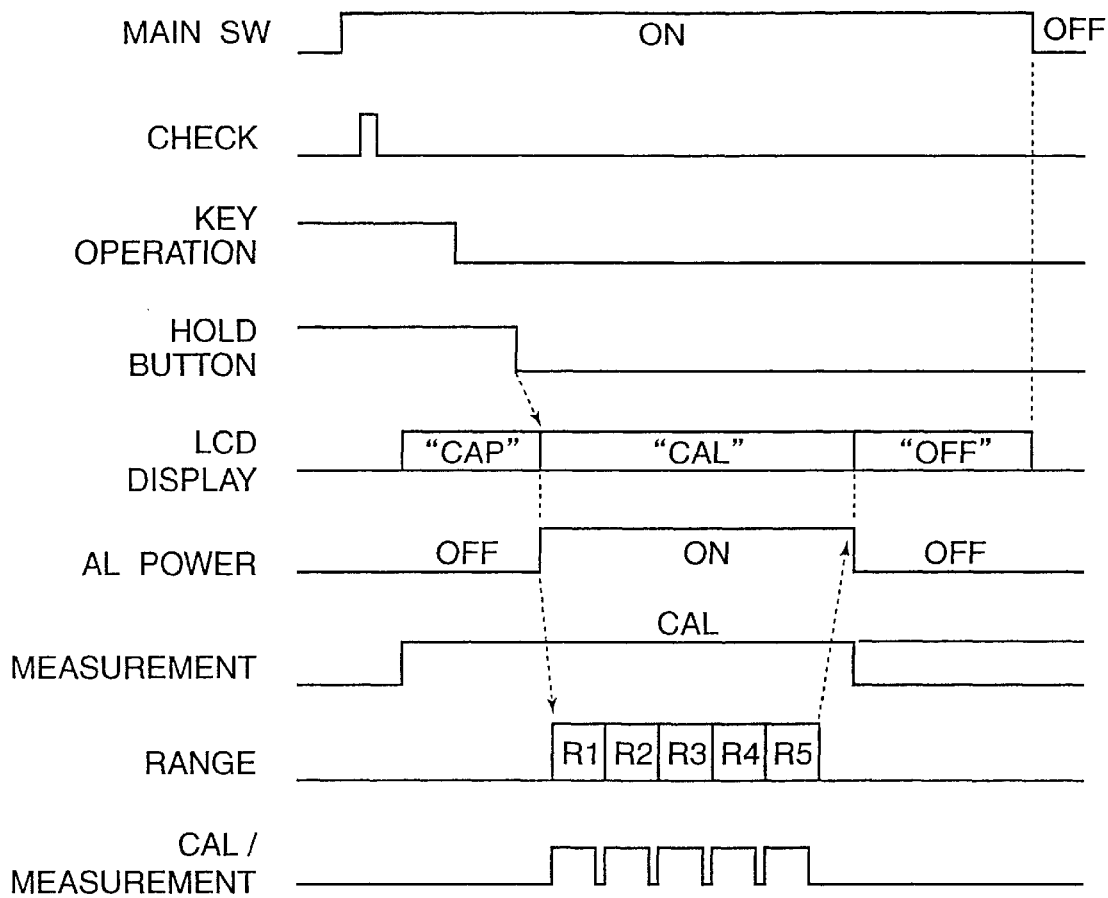
FIG. 7 is a timing chart showing an operational relationship of the illuminance meter for a performance of manual zero-point calibration according to a standard zero-point calibration method.
Figure 8:
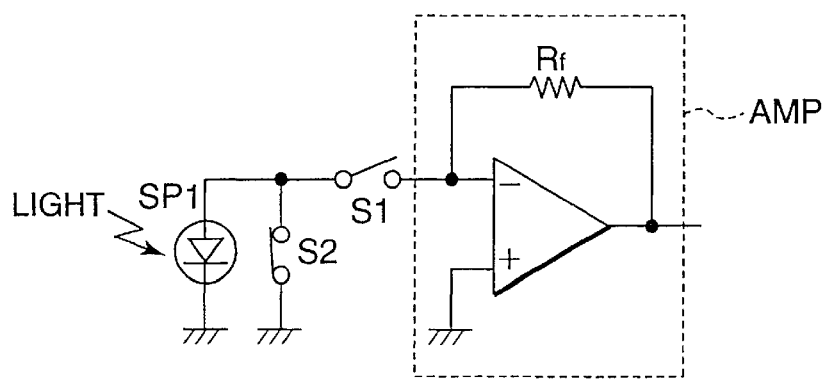
FIG. 8 is a partial construction diagram of a conventional light measuring apparatus.

FIG. 7 is a timing chart when the zero calibration is performed by the standard zero-point calibration method when the illuminance meter 1 is activated.

When the illuminance meter 1 is activated by turning the main switch 24 on, the states of the operation buttons and/or operation keys are checked. If a specific key of the second operating section 222 has been operated by a user before the main switch 24 is turned on, it is detected by the main body controller 41, thereby entering the manual calibration mode, where the zero calibration by the standard zero-point calibration method is enabled. For example, if the UP-key 222d, the DOWN-key 222e and the SHIFT key 222f are simultaneously pressed and the main switch 24 is turned on while the hold button 25 is pressed, the manual calibration mode is set and the character information "CAL" is displayed on the display panel 21. This character display is designed to notify the user that the cap should be mounted on the frame 311 of the light receiving section 3.

Subsequently, when the cap is mounted on the frame 311 of the light receiving section 3 by the user and the hold state is released by operating the hold button 25, the zero calibration is started. Specifically, after the analog power supply of the light receiving section 3 is activated and the light receiving element 51 is connected with I/V converting circuit 53, the five measurement ranges are successively switched and the illuminance measurement (i.e., measurement of the offset amounts L0S1 to L0S5) is performed for each measurement range, and the zero-point differences $\delta L01$ to $\delta L05$ between the offset amounts calculated by the simple zero-point calibration method and those calculated by the standard zero-point calibration method are calculated and renewed as described above (see CAL/Measurement Range and CAL Measurement of FIG. 7). During this time, the character message "CAL" is displayed on the display panel 21.

The calculation of the offset amounts L0S1 to L0S5 for the respective measurement ranges is substantially same as in the case of the initial zero calibration by the simple zero-point calibration method. First, after the feedback resistance value of the operational amplifier 531 is so set as to equal the parallel resistance value of the resistors R1 to R5 by turning all the switches SW1 to SW4 on, the offset amount Loff1 is measured. Thereafter, the switches SW1 to SW4 are successively turned off in the decreasing order to measure the offset amounts L0S2, L0S3, L0S4 and L0S5.

Differences between the measured offset amounts L0Si (i=1, . . . 5) and those calculated by the simple zero-point calibration method and already stored in the RAM 573 are calculated as zero-point differences $\delta L0i$ (i=1, . . . 5) and renewably stored in the EEPROM 60. In other words, the zero-point differences $\delta L0i$ (i=1, . . . 5) corresponding to the respective measurement ranges are calculated by following equation:

$$\delta L0i = L\,offi - L0Si.$$

The stored zero-point differences $\delta L0i$ (i=1, . . . 5) are used to correct the actual measurement values Lm during the normal measurements. Specifically, in the cast that the illuminance measurement value L is calculated using the zero-point difference $\delta L0i$ (i=1, . . . 5), the zero-point difference $\delta L0i$ (i=1, . . . 5) is read from the EEPROM 60 and the actual measurement value Lm is corrected in accordance with following equation:

$$L = Lm - Loffi + \delta L0i = Lm - Loffi + Loffi - L0Si = Lm - L0Si$$
(wherein $i=1, \ldots 5$).

Thus, a displacement (zero-point difference) caused by the simple zero-point calibration method can be corrected using the zero-point difference $\delta L0i$ (i=1, . . . 5). As compared to the case where the illuminance measurement value is obtained while ignoring the zero-point difference assuming that the zero-point difference is very small, measurement precision can be further improved. Since a leak characteristic of an electronic switch does not largely change within a short term, a satisfactory measurement precision can be maintained by performing the standard zero-point calibration, for example, once every six months or once a year if the displacement caused by the simple zero-point calibration method is corrected using the zero-point difference $\delta L0i$ (i=1, . . . 5) already calculated and stored as described above. This makes it remarkably easier for the user to use the illuminance meter 1.

The zero calibrations for the measurement ranges have been described thus far. Upon the completion of the zero calibrations for all the measurement ranges, the analog power supply is turned off and a character information "OFF" is displayed on the display panel 21. This character display is made to instruct the user to turn the main switch 24 temporarily. If the user turns the hold button 25 off, temporarily turns the main switch 24 off according to this instruction, and then turns the main switch 24 on again, normal illuminance measurement is enabled without performing the zero calibration by the simple zero-point calibration method.

In this embodiment, the UP-key 222*d*, the DOWN-key 222*e* and the SHIFT key 222*f* are simultaneously operated to set the manual calibration mode. However, the specific key operation for this purpose is not limited to the above. A special operation of the operation keys different from their original functions can be adopted. Accordingly, the above specific key operation may be simultaneous operation of at least two keys of the second operating section 222 or simultaneous operation of a combination of at least two keys of the first and second operating sections 221, 222. Instead of simultaneous operation, the two keys may be successively operated to set the manual calibration mode.

Since the manual calibration mode is set to enable the zero calibration by the standard zero-point calibration method by simultaneously operating a plurality of operation keys as described above, the illuminance measurement can be precisely performed by immediately performing the zero calibration by the standard zero-point calibration method even if the reliability of the zero calibration by the standard zero-point calibration method is doubtful.

Although the invention is applied to the illuminance meter 1 having a plurality of measurement ranges in the foregoing embodiment, it is not limited thereto. This invention is also applicable to illuminance meters having a single measurement range. Further, the invention is applicable not only to illuminance meters, but also to light measuring apparatuses in general which needs to obtain an offset amount corresponding to a measurement range such as an infrared intensity meter, an ultraviolet intensity meter, a light power meter, a color meter, a flash meter and an exposure meter.

As described above, the offset amount for the zero-point calibration is calculated upon every elapse of the predetermined time and the calculation result is renewably stored in the storage device (i.e., the zero-point calibration is performed in the specified cycle) in the light measuring apparatus in which the offset amount for the zero-point calibration is set by performing the illuminance measurement with the photoelectric conversion element and the light reception amount calculator electrically disconnected from each other. Accordingly, the illuminance measurement can be constantly precisely performed even if the zero point of the light measuring apparatus changes due to a change in working environment temperature and a change in characteristics of the measuring circuit resulting from a change with the passage of time. As a result, the reliability of the light measurement value can be improved.

Further, in the light measuring apparatus which has a plurality of measurement ranges and in which the offset amounts for the zero-point calibration corresponding to the respective measurement ranges are set for each measurement range by performing the illuminance measurement with the photoelectric conversion element and the light reception amount calculator electrically disconnected from each other, the offset amount for the zero-point calibration is calculated for the set measurement range every time the measurement range is switched, and the calculation result is renewably stored in the storage device. Accordingly, the zero calibration can be constantly performed using the latest offset amount regardless of which measurement range is set. This enables a light measurement of high precision.

Furthermore, in the light measuring apparatus which has a plurality of measurement ranges and in which the offset amounts for the zero-point calibration corresponding to the respective measurement ranges are set for each measurement range by performing the illuminance measurement with the photoelectric conversion element and the light reception amount calculator electrically disconnected from each other, the offset amount for the zero-point calibration is calculated at intervals of the specified period if the light measurement in the same measurement range is continued. Accordingly, the light measurement can be constantly precisely performed even if the offset amount changes due to a change in working environment temperature and a change in characteristics of the measuring circuit resulting from a change with the passage of time. As a result, the reliability of the light measurement value can be improved.

Further, the standard zero-point calibration mode is made settable and the light measurement is performed with the shaded photoelectric conversion element and the light reception amount calculator electrically connected upon the instruction of the zero-point calibration in the standard zero-point calibration mode; a difference from the offset amount for the zero-point calibration is renewably stored as a zero-point difference; and a true light reception amount is obtained by not only subtracting the offset amount corresponding to the set measurement range from the actual light reception amount, but also adding the zero-point difference thereto. Accordingly, a displacement of the offset amount for the zero-point calibration can be corrected, enabling a light measurement of higher precision.

Furthermore, the standard zero-point calibration mode is made settable by simultaneously or successively operating at least two specific ones of a plurality of operable members. Accordingly, the construction of the light measuring apparatus is allowed to be simple without necessitating an operable member for setting the mode.

As this invention may be embodied in several forms without departing from the spirit of essential characteristics thereof, the present embodiment is therefore illustrative an not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A light measuring apparatus comprising:
    a photoelectric conversion element which receives light, and converts the energy of received light to an electrical energy;
    a calculation circuit which calculates a measurement value based on a signal corresponding to the electrical energy;
    a memory which stores a correction value for correcting the measurement value;
    a corrector which corrects the measurement value using the correction value stored in the memory;
    a timer which measures an elapse of time after the correction value is stored in the memory; and
    a controller which allows calculation of a recent correction value when the timer measures elapse of a predetermined time, and permits the memory to renewably store the recent correction value.

2. A light measuring apparatus according to claim 1, wherein the correction value is an offset amount for zero-point calibration, and the corrector subtracts the offset amount from the measurement value to effect the calibration.

3. A light measuring apparatus according to claim 2, further comprising an electrical circuit which electrically connects and disconnects the calculation circuit with and from the photoelectric conversion element, wherein the controller permits the calculation circuit to calculate a first offset amount in a state where the calculation circuit is electrically disconnected from the photoelectric conversion element.

4. A light measuring apparatus according to claim 3, further comprising:

a mode setter which sets a calibration mode; and an instructor which instructs a calibration; wherein:

the controller is responsive to the mode setter and the instructor to permits the calculation circuit to calculate a second offset amount in a state where the calculation circuit is electrically connected with the photoelectric conversion element and the photoelectric conversion element is shaded when the calibration mode is set and the calibration is instructed, and obtains a difference between the first offset amount and the second offset amount, and permits the memory to store the difference; and the corrector subtracts the first offset amount from the measurement value and adds the difference to the remainder to effect the calibration.

5. A light measuring apparatus according to claim 4, further comprising a plurality of operable members, wherein the mode setter sets the calibration mode when the plurality of operable members are operated at substantially the same or continuously.

6. A light measuring apparatus according to claim 1, wherein the calculation circuit includes a range changer which changes over a plurality of measurement ranges.

7. A light measuring apparatus according to claim 6, wherein the controller is responsive to the range changer, and allows calculation of a recent correction value every changer over of the range changer, and permits the memory to renewably store the recent correction value.

8. A light measuring apparatus according to claim 6, wherein the memory stores a correction value for each of the plurality of measurement range, and the controller allows calculation of respective recent correction values for the plurality of measurement ranges in accordance with a sequential changing of the range changer.

9. A light measuring apparatus according to claim 1, wherein the signal corresponding to the electrical energy is in the form of an analog signal, and the calculation circuit includes:

an amplifier which amplifies the analog signal; and an A/D converter which converts the amplified analog signal into a digital signal.

10. A light measuring apparatus according to claim 1, further comprising a display unit which provides a display indicating that the calculation of a recent correction value is being performed.

11. A light measuring apparatus according to claim 1, wherein the measurement value is an illuminance value.

12. A light measuring apparatus according to claim 1, wherein the controller is responsive to a power source, and allows calculation of a recent correction value when the power source is turned on, and permits the memory to renewably store the recent correction value.

13. A light measuring apparatus comprising:

a photoelectric conversion element which receives light, and converts the energy of received light to electrical energy;

a calculation circuit which includes a range changer which changes over a plurality of measurement ranges, and calculates a measurement value based on a signal corresponding to the electrical energy in a changed measurement range;

a memory which stores a correction value for correcting the measurement value;

a corrector which corrects the measurement value using the correction value stored in the memory; and a controller which is responsive to the range changer, and initiates calculation of a recent correction value every change over of the range changer, and causes the memory to renewably store the recent correction value.

14. A light measuring apparatus according to claim 13, wherein the correction value is an offset amount for zero-point calibration, and the corrector subtracts the offset amount from the measurement value to effect the calibration.

15. A light measuring apparatus according to claim 14, further comprising an electrical circuit which electrically connects and disconnects the calculation circuit with and from the photoelectric conversion element, wherein the controller permits the calculation circuit to calculate a first offset amount in a state where the calculation circuit is electrically disconnected from the photoelectric conversion element.

16. A light measuring apparatus according to claim 15, further comprising:

a mode setter which sets a calibration mode; and an instructor which instructs a calibration; wherein:

the controller is responsive to the mode setter and the instructor to permits the calculation circuit to calculate a second offset amount in a state where the calculation circuit is electrically connected with the photoelectric conversion element and the photoelectric conversion element is shaded when the calibration mode is set and the calibration is instructed, and obtains a difference between the first offset amount and the second offset amount, and permits the memory to store the difference; and the corrector subtracts the first offset amount from the measurement value and adds the difference to the remainder to effect the calibration.

17. A light measuring apparatus according to claim 13, wherein the signal corresponding to the electrical energy is in the form of an analog signal, and the calculation circuit includes:

an amplifier which amplifies the analog signal; and an A/D converter which converts the amplified analog signal into a digital signal.

18. A light measuring apparatus according to claim 13, further comprising a display unit which provides a display indicating that the calculation of a recent correction value is being performed.

19. A light measuring apparatus according to claim 13, wherein the measurement value is an illuminance value.

20. A method for measuring light using a light measurement apparatus provided with a photoelectric conversion element for receiving and converting an energy of light into an electrical signal, and a calculation circuit for calculating a measurement value based on the signal, comprising the steps of:

storing a first correction value for correcting a measurement value;

judging whether a predetermined time elapses after the first correction value is stored;

calculating a second correction value when the predetermined time is judged to elapse;

renewably storing the second correction value; and correcting the measurement value with the second correction value.

21. A method according to claim 20, wherein the correction value is an offset amount for zero-point calibration, and the measurement value is corrected by subtracting the offset amount from the measurement value.

22. A method according to claim 21, wherein the second correction value is calculated by electrically disconnecting the calculation circuit from the photoelectric conversion element, and obtaining a measurement value by the calculation circuit.

23. A method according to claim 20, wherein the second correction value is calculated each time a measurement range is changed.

24. A method for measuring light using a light measurement apparatus having a plurality of changeable measurement ranges and provided with a photoelectric conversion element for receiving and converting an energy of light into an electrical signal, and a calculation circuit for calculating a measurement value based on the signal in a measurement range, comprising the steps of:

storing a first correction value for correcting a measurement value;

detecting whether the measurement range is changed;

calculating a second correction value when the measurement range is changed;

renewably storing the second correction value; and correcting the measurement value with the second correction value.

25. A method according to claim 24, wherein the correction value is an offset amount for zero-point calibration, and the measurement value is corrected by subtracting the offset amount from the measurement value.

26. A method according to claim 25, wherein the second correction value is calculated by electrically disconnecting the calculation circuit from the photoelectric conversion element, and obtaining a measurement value by the calculation circuit.

* * * * *